(12) United States Patent
Benz et al.

(10) Patent No.: US 6,442,402 B2
(45) Date of Patent: Aug. 27, 2002

(54) METHOD AND RADIO COMMUNICATION SYSTEM FOR DATA TRANSMISSION

(75) Inventors: Michael Benz; Anja Klein; Armin Sitte, all of Berlin; Thomas Ulrich, Bad Dürkheim, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/748,477

(22) Filed: Dec. 26, 2000

Related U.S. Application Data

(63) Continuation of application No. PCT/DE99/01611, filed on Jun. 1, 1999.

(30) Foreign Application Priority Data

Jun. 23, 1998 (DE) ......................................... 198 27 916

(51) Int. Cl.⁷ .............................. H04B 1/38; H04M 1/00
(52) U.S. Cl. ........................................ 455/553; 455/561
(58) Field of Search .......................... 455/69, 517, 434, 455/515, 414, 522, 553, 561

(56) References Cited

U.S. PATENT DOCUMENTS 5,257,408 A   10/1993 Olson et al.
6,028,851 A  * 2/2000 Persson et al. ............. 379/329

OTHER PUBLICATIONS

Published International Application No. WO 98/14020 (Horneman et al.), dated Apr. 2, 1998.

Published International Application No. WO 97/19525 (Dupont), dated May 29, 1997.

Published International Application No. WO 99/17582 (Willars et al.), dated Apr. 8, 1999.

* cited by examiner

Primary Examiner—Nguyen T. Vo
(74) Attorney, Agent, or Firm—Laurence A. Greenberg; Werner H. Stemer; Ralph E. Locher

(57) ABSTRACT

An individual parameter with respect to a required receptivity is determined for at least one service, and is sent by a base station, in a radio communications system which offers a number of services for mobile stations via a radio interface in a radio cell. A mobile station receives and evaluates the parameter, then compares the current receptivity of emissions of the base station with the parameter. The service is requested by the mobile station in dependence on the result of the comparison. The invention is suitable for use in TDMA and CDMA transmission systems.

15 Claims, 5 Drawing Sheets

METHOD AND RADIO COMMUNICATION SYSTEM FOR DATA TRANSMISSION

CROSS-REFERENCE TO RELATED APPLICATION

This is a continuation of copending international application PCT/DE99/01611, filed Jun. 1, 1999, which designated the United States.

BACKGROUND OF THE INVENTION

Field of the Invention

The invention relates to a method and to a radio communication system for data transmission, especially a mobile radio system comprising wide band channels in which signals are transmitted in accordance with a TDMA/CDMA or CDMA subscriber separation method.

In radio communication systems, information (for example voice, image information, internet messages or other data) is transmitted between transmitting and receiving radio stations (base station and mobile—station, respectively) via a radio interface with the aid of electromagnetic waves. The electromagnetic waves are radiated by means of carrier frequencies which are in the frequency band provided for the respective system. For future mobile radio systems with CDMA or TDMA/CDMA methods of transmission via the radio interface, for example the UMTS (Universal Mobile Telecommunication System) or other third-gene ration systems, frequencies are provided in the frequency band of approximately 2000 MHz.

In radio communication systems, the housekeeping information is used for supplying mobile stations in a radio cell of a base station with the data needed for the radio cell. Housekeeping information is information on the radio cell, its channel structure and services and options available in the radio cell. Thus, the housekeeping information is used by the mobile station for synchronization and selection of the radio cell.

From the GSM mobile radio system and for future mobile radio systems from DE 198 10 285, it is known to provide one timeslot for the transmission of housekeeping information per downlink frame. The first timeslot of the frame is usually used for this purpose. This provides fixed intervals between the emissions of the housekeeping information which are planned in such a manner that a proper evaluation of the housekeeping information and a handover of the mobile stations for all services between various radio cells is supported even in unfavorable traffic load situations and at the maximum permissible speed of the mobile stations. In W-CDMA transmission methods, too, housekeeping information is transmitted continuously in a timeslot or over a number of timeslots in accordance with a frame structure.

The only available criterion for the mobile station of whether registration in the radio cell is possible is the receivability or receptivity of the housekeeping information which is usually sent at high and constant power. If registration, i.e. the setting up of a connection, is possible, the available services can be requested. These are voice or short message services in the GSM mobile radio system.

If, however, it is intended to extend the range of services on offer, it must be ensured even for the most sophisticated service that this service can also be received well with adequate receivability or receptivity of the housekeeping information. This means severe restrictions for the radio network planning.

SUMMARY OF THE INVENTION

It is accordingly an object of the invention to provide a method and a radio communication system with a number of services which overcome the above-mentioned disadvantageous of the prior art apparatus and methods of this general type, and which allow greater flexibility in the radio network planning.

With the foregoing and other objects in view there is provided, in accordance with the invention a method for transmitting data between a base station and a plurality of mobile stations in a radio communication system. The method includes offering a plurality of services for a plurality of mobile stations via a radio interface in a radio cell of a base station. For at least one service, an individual parameter with respect to a required receivability or receptivity is determined. The parameter is transmitted from the base station, and the parameter is received and evaluated with one of the plurality of mobile stations. In the one of the plurality of mobile stations, a current receivability or receptivity of emissions from the base station is compared with the parameter. The one of the plurality of mobile stations requests or does not request the service, dependent upon the result of the comparison.

An individual parameter with respect to a necessary receivability or receptivity is determined, and sent by the base station, for at least one service in a radio communication system which offers a number of services for mobile stations in a radio cell via a radio interface. The parameter is received and evaluated by a mobile station and then the current receivability or receptivity of emissions of the base station is compared with the parameter and the service is requested by the mobile station in dependence on the result of the comparison.

Thus, the service request is no longer dependent only the current receivability or receptivity of emissions of the base station. The current receivability or receptivity must be additionally compared with the service-specific parameters with respect to the receivability or receptivity for a service. If this parameter is satisfied, this service can be requested. The planning of control channels as a basis for determining the receivability or receptivity is thus largely independent of the planning of the coverage with the individual services.

Each service can have its own range which does not mandatorily have to correspond to the size of the cell. At the same time, the mobile station can locally request an authorization for a service before there is access to the radio interface.

In accordance with an added feature of the invention, the parameter is a value used to refer to a maximum permissible attenuation, a minimally required received field strength, a minimally required signal/noise ratio and/or a maximum permissible signal delay. It is also possible to send and evaluate a number of parameters per service. Where there are several evaluated parameters, the reliability is increased that the service can also be reliably maintained after the connection has been set up.

In the determination of the parameter by the network, a maximum data rate per service or for the entire radio interface, a quality of service to be guaranteed for the service and/or any current utilization of the radio interface is taken into consideration. It is thus possible to form for each service or at least for the services, the ranges of which do not continuously coincide with that of the housekeeping information, one or more criteria which enable each mobile station to determine the availability of a service without prior interaction at its current position and under its current conditions of reception.

In this context, the individual services are voice services, emergency call services, short message services, teletext services, facsimile services, an internet service or image transmission services. The radio communication system can offer these services without their availability having first to be tested by the mobile station. Any unnecessary loading of the radio interface by an unsuccessful request of a service is avoided if the request is advantageously blocked with respect to this base station in the case of a negative result of the comparison. This means that, as long as the current conditions of reception are not improved, no request is sent to the base station by the mobile station.

In accordance with an additional feature of the invention, the current receivability or receptivity is derived from the evaluation of received signals of a control channel and the radio interface is organized with wide band channels in accordance with a TDD transmission method. This guarantees the application of the method according to the invention in third-generation mobile radio systems which, with very different cell sizes, asymmetric utilizations of the radio interface, many different services and applications, make great demands both in the full-coverage mobile radio system and in the domestic area.

With the foregoing and other objects in view there is provided, in accordance with the invention a radio communications system in which a plurality of services are offered for a plurality of mobile stations via a radio interface in a radio cell of a base station. The radio communications system includes a base station and at least one mobile station. The base station includes: a signal conditioning facility for forming signals with information to be transmitted; a controller for determining an individual parameter with respect to a required receivability or receptivity for at least one service; and a transmitting facility for transmitting the signals, some of the signals containing the parameter. The mobile station includes: a receiving facility for receiving and evaluating the parameter; an evaluating facility for comparing a current receivability or receptivity of emissions from said base station with the parameter; and a calling facility for requesting a service dependent upon a result of the comparison.

Other features which are considered as characteristic for the invention are set forth in the appended claims.

Although the invention is illustrated and described herein as embodied in a method and radio communication system for data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
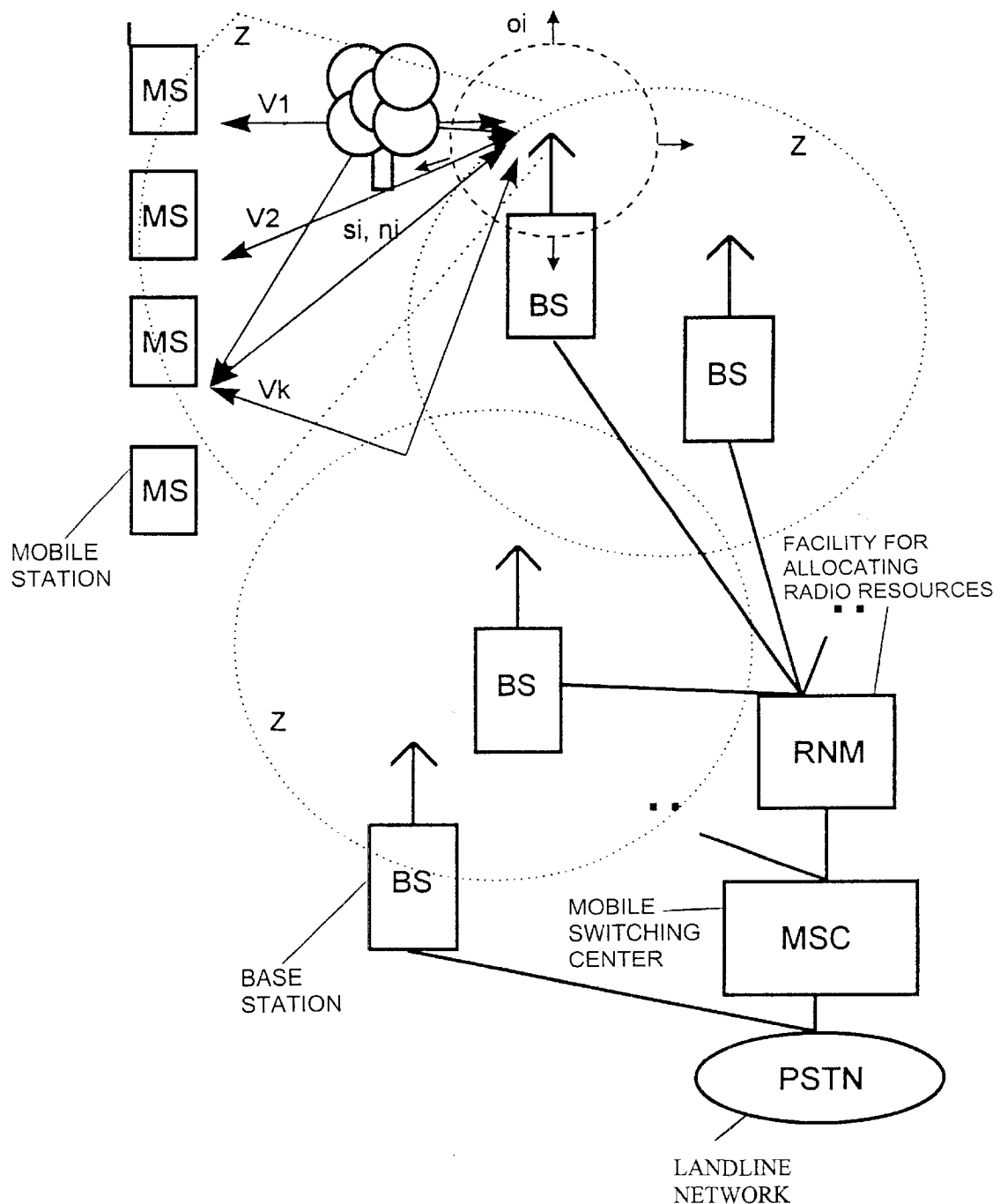
FIG. 1 shows a block diagram of a mobile radio System.

Referring now to the figures of the drawing in detail and first, particularly, to FIG. 1 thereof, there is shown an example of a radio communication system. Specifically, there is shown a mobile radio system with a multiplicity of mobile switching centers MSC which are networked together and which respectively, establish access to a landline network PSTN. These mobile switching centers MSC are also connected to in each least one facility RNM for allocating radio resources. Each of these facilities RNM, in turn, provides for a connection to at least one base station BS. Such a base station BS can set up a connection to other radio stations, e.g. mobile stations MS or other mobile and stationary terminals via a radio interface. Each base station BS forms at least one radio cell Z.

In the case of sectorization or in the case of hierarchical cell structures, a number of radio cells Z are also supplied by each installed base station BS. The facility RNM for allocating radio resources and a number of base stations BS form a base station system.

In FIG. 1, connections V, designated as V1, V2, Vk by way of example, for transmitting user information ni and signaling information si between mobile stations MS and a base station BS are shown. Housekeeping information oi is transmitted to a number of mobile stations MS in the form of a point-to multipoint connection.

Control and maintenance functions for the mobile radio system and for parts thereof are implemented by an operation and maintenance center OMC. The functionality of this structure can be implemented in other radio communication systems in which the invention can be used, especially for subscriber access networks with a wireless subscriber line. Base stations which are used as home base stations in the private domain without being affected by the radio network planning can also set up connections to mobile stations MS. These home base stations are connected to a landline network.

Figure 2:
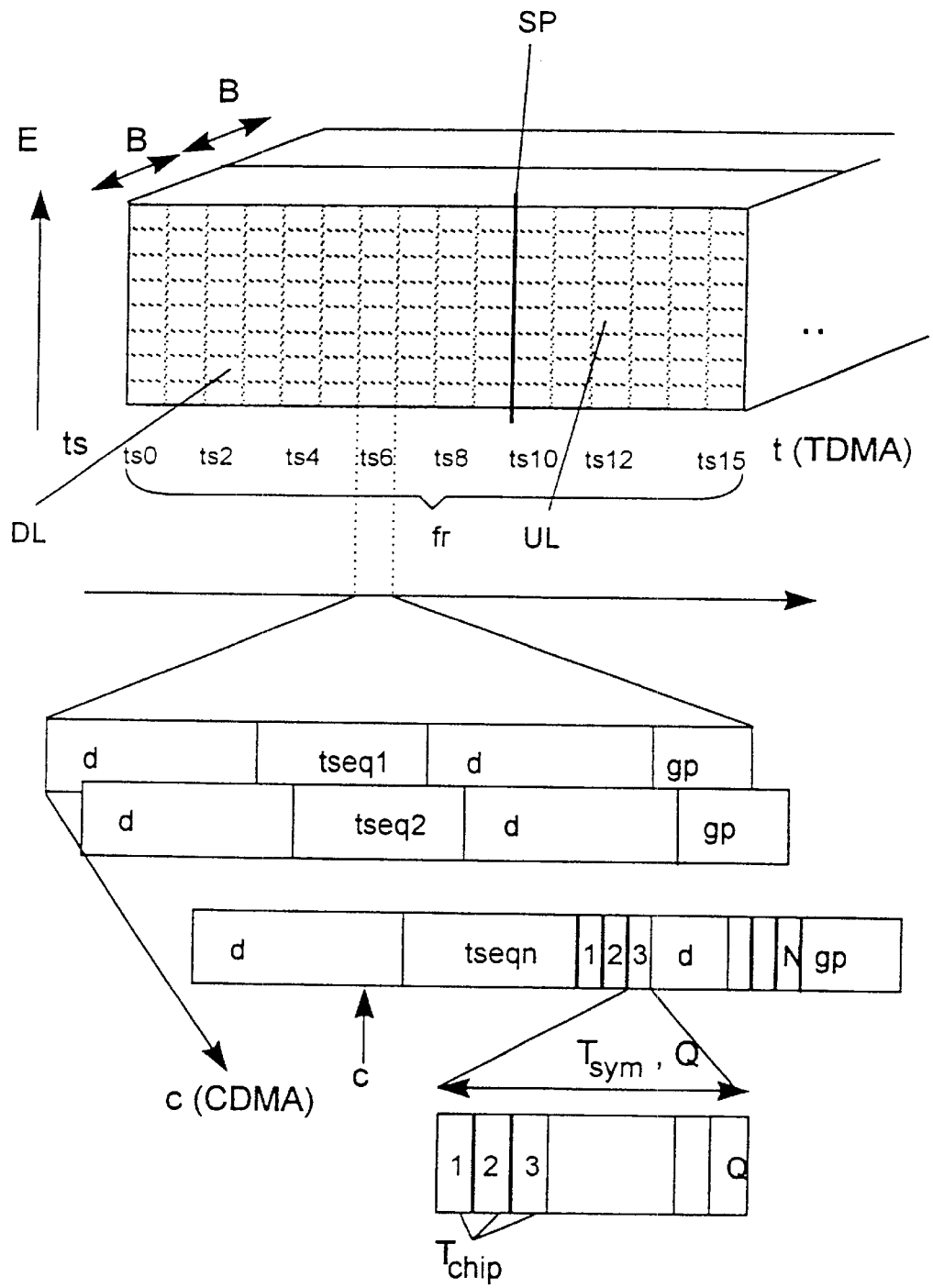
FIG. 2 shows a diagrammatic representation of the frame structure of the TDD transmission method.

FIG. 2 shows a frame structure of the radio transmission. A TDMA component provides for a wide frequency band, for example of bandwidth B=5 MHz, to be divided into a number of timeslots ts of the same duration, for example 16 timeslots ts0 to ts15. Some of the timeslots ts0 to ts9 are used in the downlink DL and some of the timeslots ts10 to ts15 are used in the uplink UL. Between these, there is a switching point SP. In this TDD transmission method, the frequency band for the uplink UL corresponds to the frequency band for the downlink DL. The same is repeated for other carrier frequencies.

Within a timeslot provided for transmitting information oi, si, ni, information of a number of connections is transmitted in radio blocks. Alternative exemplary embodiments provide continuous transmission of the information oi, si, ni in time. These radio blocks for transmitting user data consist of sections with data d in which training sequences tseq1 to tseqn known at the receiving end are embedded. The data d are spread with a fine structure, and have a subscriber code c, for each individual connection so that at the receiving end, for example, n connections can be separated by this CDMA component.

The spreading of individual symbols of the data d has the effect that Q chips of duration $T_{chip}$ are transmitted within the symbol period $T_{sym}$. The Q chips here form the subscriber code c for each individual connection. Furthermore, a guard period gp for compensating for different signal delays of the connections is provided within the timeslot ts.

Within a wide frequency band B, the successive timeslots ts are arranged in accordance with a frame structure. Thus, 16 timeslots ts are combined into a frame fr.

The parameters used for the radio interface are advantageously:

Chip rate:: 4.096 Mcps
Frame period: 10 ms
Number of timeslots: 16
Duration of one timeslot: 625 μs
Spreading factor: 16 (but variable)
Type of modulation: QPSK
Bandwidth: 5 MHz
Frequency reuse value: 1

These parameters provide for the best possible harmonization with an FDD (frequency division duplex) mode for the third mobile radio generation. However, the method according to the invention can also be used in FDD mode.

Figure 3:
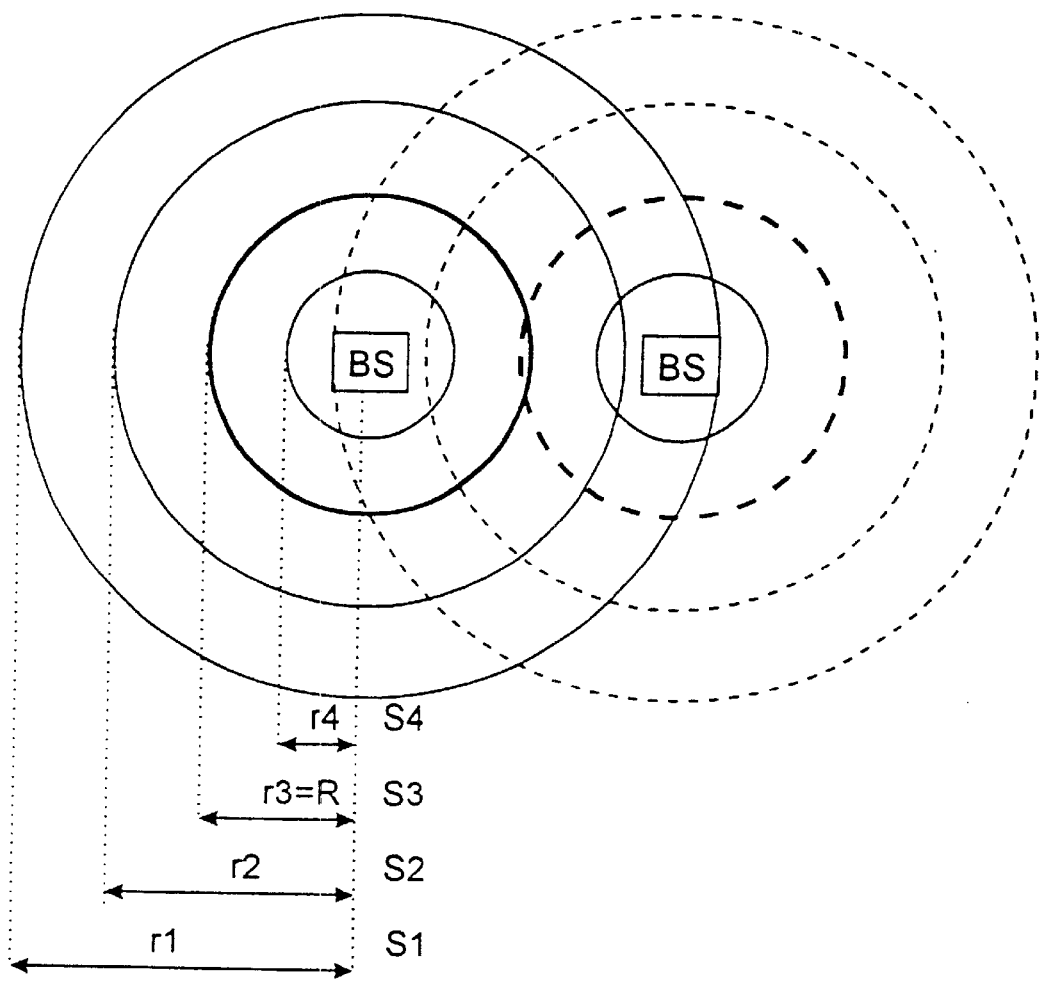
FIGS. 3 and 4 show diagrammatic representations of the coverage of mobile stations with different services.
Figure 4:
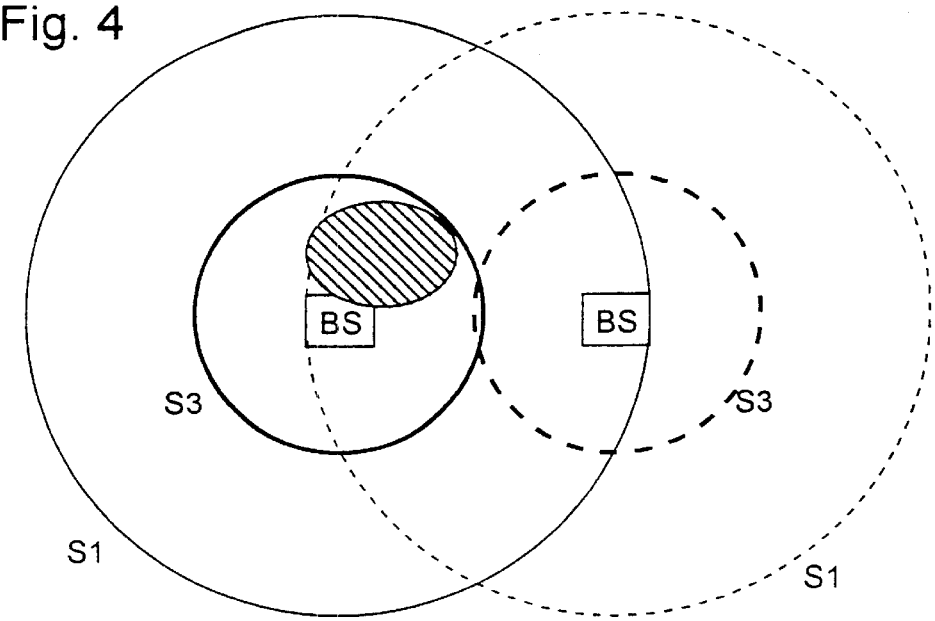

FIG. 3 shows two adjacent base stations BS which in each case offer services S, e.g. S1, to S3, the range of r1 to r4 of which is different. According to FIG. 3, let R be the spatial cell radius which is obtained from the spatial distance of the base stations BS, the distance being equal to 2R. R is selected in accordance with the services S which are to be offered as full coverage. In the example of FIG. 3, these are the services S1, S2, S3 belonging to the ranges r1, r2 and r3. Service S4 is not available for full coverage.

FIG. 3 also shows that less sophisticated services are available beyond the cell boundaries. These services S1 and S2 can thus also be received in neighboring cells independently of whether they are also additionally offered in these radio cells. This creates overlapping coverage areas of different base stations BS in which the base station BS can be selected for a service S1 or S2. This overlap is intended and is not prevented by restricting the range of the control channel BCCH.

This overlap is also of significance, in particular, for the coverage of areas with a large number of subscribers within radio cells, so-called, "hot spots". In these areas, the density of subscribers is greater so that the radio resources provided by the first base station BS1 are not always adequate. According to the invention, the second base station BS2 can take over some of the traffic for the service S1. Due to the decoupling of range R of the radio cell from range r1 to r4 of a service S, the distribution of resources in the radio network is much more flexible.

So that the mobile stations MS can determine in good time that a service S is available, i.e. before requesting the service S, an individual parameter ke with respect to the receptivity of the service S is sent by the base station BS for at least one service S, advantageously in the housekeeping information oi.

The parameters ke are derived by the network from a maximum data rate per service or for the entire radio interface, with a quality of service to be guaranteed for the service and/or the current utilization of the radio interface. As an alternative, the parameter ke can also be permanently stored in the mobile stations MS and transmitted additionally in a radio cell, and thus updated, only under certain conditions.

Sending the parameter ke creates a flexibility from radio cell to radio cell which can also be time-dependent and thus load-dependent. This flexibility allows the traffic in the radio cells to be actively influenced. If the parameter is increased for a service S in a cell, mobile stations MS newly registering will prefer neighboring cells having lower parameters ke for this service S if these are available. The ratio between larger and smaller cells can also be formed individually for each service.

The parameter ke is a value used to refer to:
a maximum permissible attenuation,
a minimally required received field strength,
a minimally required signal/noise ratio and/or
a maximum permissible signal delay.

The parameter ke can be defined as an absolute value and relative to a reference value. A parameter ke can combine a number of these values but, as an alternative, it is also possible to transmit a number of parameters ke separately for each service. Thus, a number of comparisons, which are performed with the parameters ke as decision thresholds, are necessary for deciding on the availability of a service.

In the situation where the result of the comparison is negative, unnecessarily loading the radio interface with an unsuccessful request of a service S is avoided by blocking the request of the service S with respect to the base station BS for the emissions of which the comparison was made.

Figure 5:
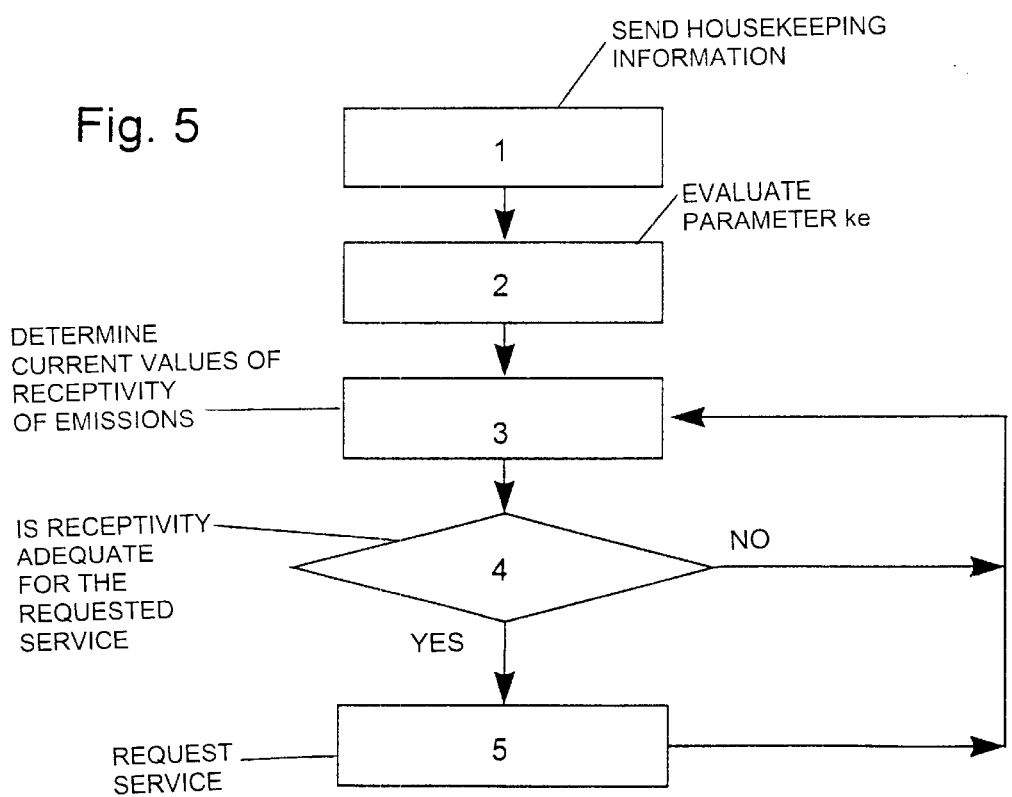
FIG. 5 shows a flowchart of the transmission of housekeeping information.

The method according to the invention is shown diagrammatically in FIG. 5. In a first step 1, housekeeping information oi is sent by means of a TDMA/CDMA or CDMA subscriber separation method which contains at least one parameter ke about a service S. In a second step 2, the mobile station NIS receives the parameter ke and evaluates it.

In a third step 3, the current receptivity of emissions of the base station is determined by the mobile station MS. This is done by evaluating the received signals of the control channel BCCH so that the corresponding current values for the attenuation, the received field strength, the signal/noise ratio and/or the signal delay are available.

In a fourth step 4, the values of the current receptivity are compared with the parameter. If the current receptivity is adequate for the requested service, the service S is requested by the mobile station MS in a fifth step. If not, the current receptivity is monitored further and emissions of other base stations BS are evaluated.

Figure 6:
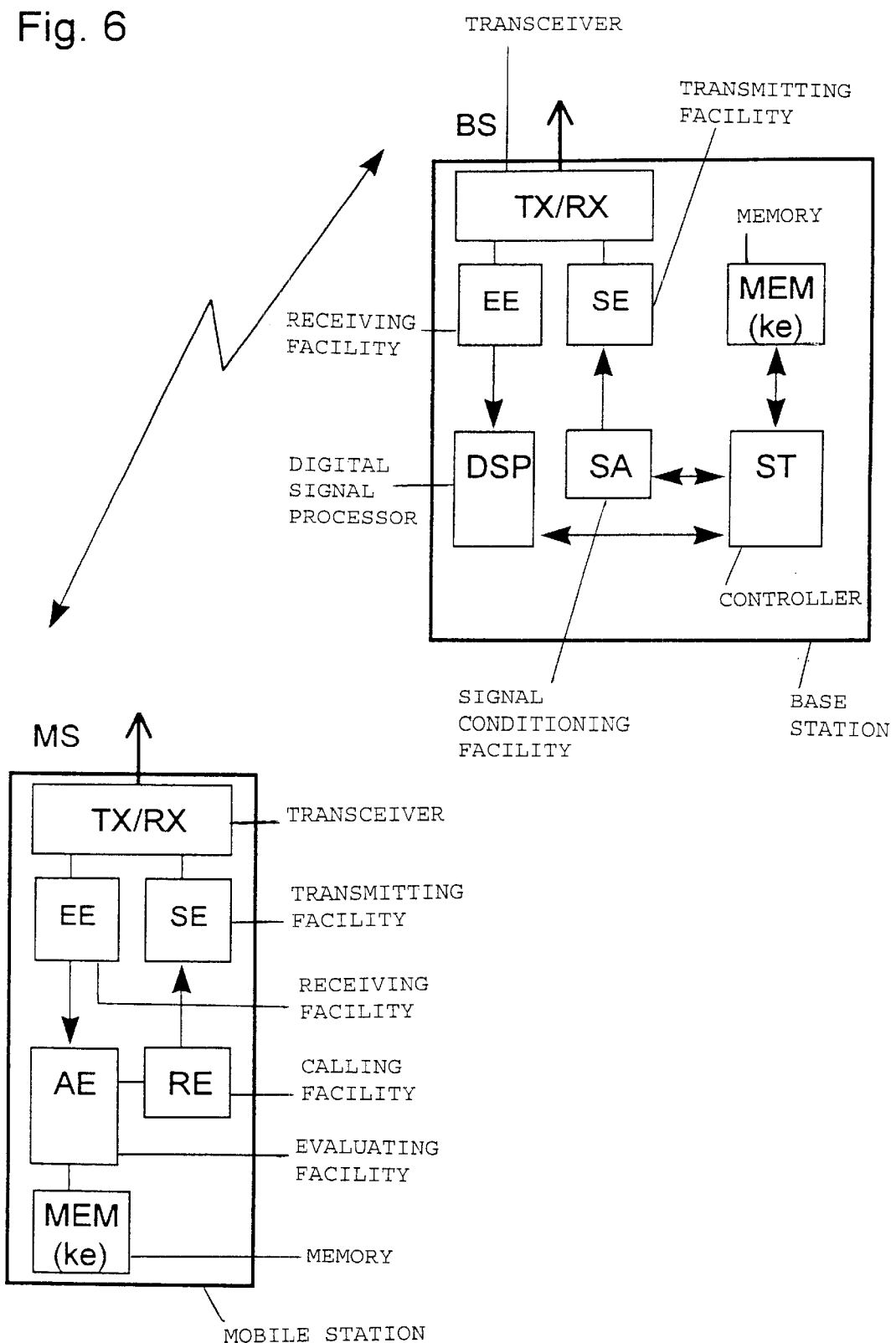
FIG. 6 shows a simplified block diagram of a base station and a mobile station.

According to FIG. 6, the information is transmitted in a base station BS, wherein the administration of the information on the services offered and their parameters ke are influenced by the operation and maintenance center OMC, and the specifications of the facility RNM for the allocation of radio resources are observed. The base station BS contains a transceiver section TX/RX for the radio-frequency processing of transmitted and received signals.

Furthermore, a transmitting facility SE and a receiving facility EE are connected to the transceiver section TX/RX. In the transmitting facility SE, the signals are digital/analog converted, converted from the baseband to the radiated frequency range and the transmitted signals are modulated. A signal conditioning facility SA has previously assembled the information oi, si, ni to be transmitted into radio blocks and allocated it to the corresponding frequency band and timeslot. A signal processing facility DSP evaluates processed signals, corresponding to the transmitting facility SE, via the receiving facility EE and conducts a channel estimation and a data detection.

The interaction of the components, the setting of the switching point SP and the allocation of the housekeeping information oi to the timeslots is controlled by a controller ST. Associated data on the transmitting and the switching point SP, the actual situations of the connections and the parameters ke are stored in a memory device MEM.

Correspondingly to the base station BS, the mobile station MS includes a transceiver TX/RX, a transmitting facility SE, and a receiving facility EE. The signals with respect to parameters ke and the current receptivity, received by the receiving facility EE, are accepted by an evaluating facility AE. The parameters ke are then compared with the associated current receptivity values. In a storage facility SP, temporary storage is carried out. A calling facility RE initiates the transmission of a request of a service S via the transmitting facility SE in the case of a positive result of the comparison.

The mobile station MS can also derive another parameter for another service from the received parameter ke.

We claim:

1. A method for transmitting data between a base station and a plurality of mobile stations in a radio communication system, which comprises:
    offering a plurality of services for a plurality of mobile stations via a radio interface in a radio cell of a base station;
    for at least one of the plurality of the services, determining an individual parameter with respect to a required receptivity;
    transmitting the parameter from the base station;
    receiving and evaluating the parameter with one of the plurality of mobile stations;
    with the one of the plurality of mobile stations, comparing a current receptivity of emissions from the base station with the parameter; and
    depending upon the result of the comparison, requesting the the one of the plurality of the services, with the one of the plurality of mobile stations.

2. The method according to claim 1, wherein the parameter is a value referring to a maximum permissible attenuation.

3. The method according to claim 1, wherein the parameter is a value referring to a minimally required received field strength.

4. The method according to claim 1, wherein the parameter is a value referring to a minimally required signal/noise ratio.

5. The method according to claim 1, wherein the parameter is a value referring to a maximum permissible signal delay.

6. The method according to claim 1, which comprises:
    from the received parameter, deriving at least one further parameter for another one of the plurality of the services; and performing the derivation in the one of the plurality of mobile stations.

7. The method according to claim 1, which comprises determining the parameter by taking into consideration a maximum data rate of the radio interface.

8. The method according to claim 1, which comprises determining the parameter by taking into consideration a maximum data rate of th e one of the plurality of the services.

9. The method according to claim 1, which comprises determining the parameter by taking into consideration a quality of service that is to be guaranteed for the one of the plurality of the services.

10. The method according to claim 1, which comprises determining the parameter by taking into consideration a current utilization of the radio interface.

11. The method according to claim 1, which comprises selecting the plurality of services from the group consisting of voice services, emergency call services, short message services, teletext services, facsimile services, an internet service, and image transmission services.

12. The method according to claim 1, which comprises deriving the current receptivity of emissions from the base station by evaluating received signals of a control channel.

13. The method according to claim 1, wherein the one of the plurality of mobile stations blocks requesting the one of the plurality of the services if the result of comparing the current receptivity of the emissions from the base station with the parameter is negative.

14. The method according to claim 1, which comprises organizing the radio interface with wide band channels in accordance with a TDD transmission method.

15. A radio communications system in which a plurality of services are offered for a plurality of mobile stations via a radio interface in a radio cell of a base station, the radio communications system comprising:
    a base station including:
        a signal conditioning facility for forming signals with information to be transmitted,
        a controller for determining an individual parameter with respect to a required receptivity for at least one of the plurality of the services, and
        a transmitting facility for transmitting the signals, some of the signals containing the parameter; and
    at least one mobile station including:
        a receiving facility for receiving and evaluating the parameter,
        an evaluating facility for comparing a current receptivity of emissions from said base station with the parameter, and
        a calling facility for requesting one of the plurality of the services dependent upon a result of the comparison.

* * * * *